United States Patent Office 3,296,240
Patented Jan. 3, 1967

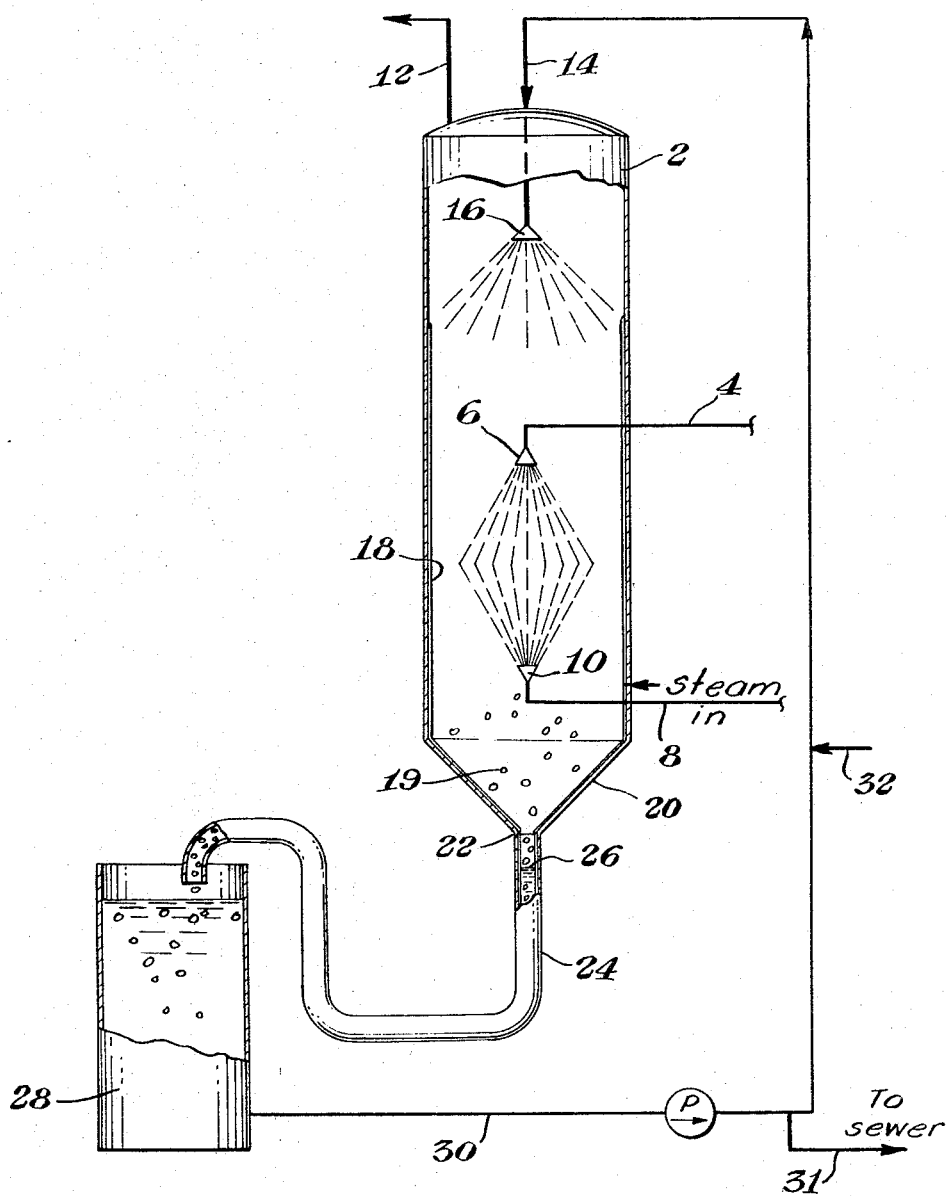

3,296,240
RECOVERY OF α-OLEFIN POLYMERS FROM SOLUTION
Stephen R. MacDonald and Robert L. Dostal, Midland, Mich., assignors to The Dow Chemical Company, Midland, Mich., a corporation of Delaware
Filed May 3, 1963, Ser. No. 277,826
5 Claims. (Cl. 260—93.7)

This invention relates to the separation of polymers from a solution of polymer and liquid. More particularly the invention relates to an apparatus and a process for removing soluble atactic and low molecular weight polymers from their polymerization reaction mixture and recovering and recycling the polymerization solvent.

Various processes are known for producing polymers of α-olefins such as ethylene, propylene, etc. by carrying out the polymerization in the presence of catalysts. Some of these processes employ metal-containing catalysts such as a Ziegler-type catalyst system, e.g. a mixture of an alkyl aluminum compound and a compound of a heavier metal of group IV–B, V–B or VI–B of the periodic system of the elements. A large number of alkyl aluminum compounds are operable including aluminum trimethyl, aluminum triethyl, aluminum tripropyl, aluminum triisobutyl, dialkyl aluminum halides and dialkyl aluminum hydrides. Salts of titanium, zirconium, vanadium, uranium, thorium and chromium are oftentimes preferred as the groups IV–B, V–B or VI–B metallic compounds in the catalyst systems, although salts of the remaining metals in these sub-groups may also be employed. Such polymers are well described in the literature. Polyolefin Resin Processes by Marshall Sittig, published in 1961 by the Gulf Publishing Company, Houston, Texas, gives a description of the composition and preparation of these types of polymers.

In such polymerization processes, inert organic liquids are often employed as reaction media. Suitable media include aliphatic, alicyclic and aromatic hydrocarbons with low to medium boiling ranges. Specific examples are propane, butane, pentane, hexane, heptane, cyclohexane, alkylated cyclohexane, benzene, toluene, kerosene and diesel oil. The resulting polymerization reaction products are often obtained in the form of a mixture wherein a portion of the polymer is dissolved in the liquid media and a portion is in the form of a slurry suspended therein.

The insoluble portion of the polymer can be removed from the mixture by conventional techniques such as filtration or centrifugation. The dissolved polymer portion has previously been separated by a variety of procedures. Treatment with an organic non-solvent precipitates the polymer but makes subsequent separation of the non-solvent and the polymerization solvent difficult. The polymer-containing solution may be injected into water with resulting precipitation of the polymer, but the polymerization solvent is not completely removed thereby necessitating further treatment. The polymer-containing solution may be introduced into a stripping apparatus containing water where the solvent is stripped off with steam injected below the surface of the water and passes overhead while a mixture of polymer and water is pumped off the bottom of the stripper. The precipitated polymer is sticky or gummy and tends to foul the separator by adhering to the metal surfaces thereof. Attempts have been made to overcome this difficulty by positioning a "preconcentrator" unit inside the stripper and maintaining the inside walls of the preconcentrator continuously wet with a film of water. The polymer-containing solution is sprayed first into the preconcentrator where it impinges onto a surface wet with water and forms an aqueous slurry which falls into the water maintained in the main body of the stripper with substantially reduced contact with the stripper unit walls and is separated as described above. This apparatus has the disadvantage of leaving the surface of the stripper above the water level untreated so that the polymer slurry as it drops from the preconcentrator into the water in the stripper tends to splash up on these untreated surfaces and adhere thereto. Since many polymers which it is desired to treat have a lower density than water, they float on the water, agglomerate and are difficult to remove from the stripper especially in a continuous manner.

An object of this invention is to provide an improved apparatus and method for removing soluble polymers from their polymerization reaction mixture.

Another object is to provide an improved apparatus and method for reducing apparatus fouling by polymer and to separate polymer from polymerization solvent.

A further object is to provide an improved apparatus and method for separating such soluble polymers from their polymerization catalyst residues.

A still further object is to provide an improved apparatus and method for separating polymerization solvent from polymer which has a density less than that of water in a continuous manner without forming large agglomerates of polymer.

Various other objects, advantages and features of the invention will become apparent from the following detailed description.

The objects of this invention are attained by an improved apparatus and method in which the product of polymerization of a monomer in an inert organic diluent in the presence of an organometal catalyst in known manner as set forth hereinbefore is withdrawn from the polymerization reaction zone, digested with a liquid organic monohydroxy compound to solubilize catalyst residues and treated for removal therefrom of the solid polymer fraction as by filtration or centrifugation. The remaining liquid phase of the reaction mixture is injected into a stripping zone defined by solid wall surfaces along with a non-solvent liquid which is immiscible with either the polymer or polymerization solvent. A film of this latter liquid is maintained on the interior surfaces of the walls of the stripping zone. Steam is also injected into the stripping zone in a direction countercurrent to the direction of injection of the polymer-containing solution. The volatilized polymerization solvent is removed overhead from the stripping zone while a mixture of precipitated solvent soluble polymer, the non-solvent liquid which is immiscible with either the polymer or polymerization solvent, and the catalyst residues is removed from the bottom of the stripping zone. The precipitated polymer is separated from this slurry such as by filtration, centrifugation or decantation.

The figure is a schematic illustration of one mode of the apparatus used in carrying out this invention.

Referring to the figure, a polymer solution composed of polymerization solvent, polymer soluble therein and catalyst residues which has been removed from a polymerization reactor and treated for removal of insoluble polymer as described above, is introduced into hollow stripper vessel 2 via line 4 through spray nozzle 6. Steam is introduced into stripper 2 via line 8 terminating in spray nozzle 10 in a direction countercurrent to the direction of flow of the polymer solution. The steam volatilizes the polymerization solvent component of the polymer solution which rises to the top of stripper apparatus 2 and passes out of the same through line 12 where it is condensed, undergoes further treatment to remove the last traces of water and impurities, and is recycled to the polymerization reactor (not shown). The interior walls of stripper 2 are kept wet by a fluid which is immiscible with the polymerization solvent introduced into stripper 2 via line 14 through spray nozzle 16. This fluid forms film 18 which cascades down the lateral interior surfaces of stripper 2. As the polymerization solvent is volatilized, the polymer 19 preciptates and falls to bottom 20 of stripper 2 as a slurry with any condensed steam that might form and the fluid-forming film 18 on the walls of stripper 2. During this treatment, the soluble catalyst residues transfer from the polymer solution to the aqueous phase. Bottom 20 of stripper 2 slopes downwardly with decreasing cross-sectional area to outlet 22 through which the aforementioned polymer-containing slurry passes into seal leg 24. The operating conditions are chosen so that there is no liquid maintained in stripper 2 other than those liquids passing therethrough. Liquid level 26 is maintained in seal leg 24. Thus, polymer agglomeration in stripper 2 is at a minimum. Some agglomeration occurs in seal leg 24, but since this element is of generally uniform cross-section, plugging thereof by the polymer is negligible. The aqueous polymer slurry passes from seal leg 24 into settling tank 28 from which the solid polymer 19 is collected, withdrawn, separated and dried by conventional techniques (not shown). The liquid phase from settling tank 28 composed of the fluid which is immiscible with the polymerization solvent, condensed steam and catalyst residues may be withdrawn therefrom through line 30 and recycled to stripper 2 via line 14 to again wet the walls thereof or discarded by way of line 31. Fresh liquid may be provided for this purpose via line 32 or alternatively a combination of recycle liquid and fresh liquid may be used.

The bottom of the stripper apparatus must be sealed off in some manner so that volatilized solvent is not lost therethrough to the atmosphere. The most satisfactory method of effecting such a seal was found to be with a liquid seal leg of U-shaped configuration which allows the liquid level of the non-volatilized material passing through the stripper apparatus to be maintained in the seal leg rather than in the stripper apparatus itself. It was found that if the liquid level was not maintained in the seal leg but was allowed to raise into and fill the lower portion of the stripper vessel, the precipitated polymer would tend to float on the liquid surface and agglomerate to such an extent that the vessel would become plugged with sticky masses of polymer and would have to be shut down and cleaned out. In contrast, when the liquid level was maintained down in the seal leg, the precipitated polymer fell to the bottom of the stripper apparatus and on into the seal leg substantially without agglomeration. The polymer particles can agglomerate in the seal leg, but due to the essentially uniform cross-sectional area of this unit, pass therethrough in plug flow without fouling the apparatus.

The liquid organic monohydroxy compound used in the digestion step in treating the polymerization reaction product slurry as removed from the reactor may be a glycol monoether such as dipropylene glycol methyl ether, tripropylene glycol methyl ether, 2-ethoxyethanol, 2-isopropoxyethanol, 2-(2-ethoxyethoxy)-ethanol, 1-methoxy-2-propanol and the like or a saturated aliphatic monohydroxy alcohol having from 2 to 10 carbon atoms, such as ethanol, isopropanol, n-propanol, n-butanol and the like.

The following examples are illustrative of the invention and are not intended to limit the scope thereof.

*Example I*

Polyethylene was prepared following well known procedures by polymerizing ethylene in the presence of a catalytic mixture of titanium tetrachloride and aluminum triethyl dispersed in hexane. At the completion of the reaction, the reaction product slurry was removed from the reactor and digested with 5 percent (based on the weight of the reaction product slurry) normal propanol to solubilize the catalyst residues. The insoluble polymer fraction of the slurry war removed therefrom by centrifugation and washed with one pound dry hexane per one pound polymer to remove the catalyst residues. This polymer fraction was then dried and stored for further fabrication. The supernatant liquid from the centrifuge was passed through a liquid-liquid extractor where it was contacted with water to remove the normal propanol and most of the catalyst residues. The solution from the extractor containing hexane, soluble polymer and the remaining catalyst residues was then sprayed into the vertically positioned stripper in a downward direction at atmospheric temperature (20° C.) at a rate of 200 gallons/hr. Steam was sprayed into the stripper in an upward direction from a position below the point of introduction of the polymer-containing solution countercurrently thereto at a temperature of 225° C. under a pressure of 150 pounds per square inch. Water was sprayed into the stripper in a downward direction from a position above the point of introduction of the polymer-containing solution at a temperature of 74° C. and a rate of 270 gallons/hr. The water formed a continuous falling film on the interior lateral surfaces of the stripper. When the polymer-containing solution spray mixed with a steam spray, the hexane volatilized and passed overhead where it was collected, condensed, cleaned up and recycled to the reactor, the hexane-soluble polymer precipitated and passed to the bottom of the stripper, while the remaining catalyst residues transferred to the aqueous phase and also passed to the bottom of the stripper. The slurry of polymer, remaining catalyst residues and water passed through the U-shaped seal leg at the bottom of the stripper and hence into a settling tank. The waxy, sticky, solvent-soluble polymer, which was collected in an amount equal to 0.1 percent of the weight of solvent-insoluble polymer formed in the polymerization reaction, was removed from the settling tank, dried and stored for further fabrication. The uniform purified quality of this polymer was evident by its white color indicating the absence of a significant amount of catalyst residues. The water was removed from the settling tank and recycled to the stripper.

*Example II*

Polypropylene was prepared following well known procedures by polymerizing propylene in the presence of a catalytic mixture of titanium trichloride and aluminumtriethyl dispersed in hexane. The polymerization reaction product was treated in a manner similar to that described in Example I. In this run, the hexane-soluble polymer fraction amounted to 12 percent of the weight of the hexane-insoluble fraction. This higher concentration of polymer in the feed to the stripper than existed in Example I was successfully separated even though the hexane-soluble polypropylene proved to be even more sticky and susceptible to agglomeration than the hexane-soluble polyethylene of Example I.

While the foregoing description has been concerned mainly with the polymerization of polyethylene and polypropylene and their recovery from a polymerization reaction mixture, it is not intended that the invention be so limited but that it include such treatment of homopolymers and copolymers of the other α-olefin compounds as well as the separation of any waxy, sticky, gummy solvent-soluble solid from a solution thereof in a solvent.

What is claimed is:

1. Continuous process for recovery of solvent-soluble α-olefin polymers from the solution thereof in volatile liquid solvents therefor by introducing a solution of an α-olefin polymer in a volatile liquid solvent therefor by spraying the same into a stripping zone defined by solid wall surfaces, spraying steam into the stripping zone in flow countercurrent to the flow of the polymer solution, introducing into the stripping zone and flowing over the interior surfaces of the walls defining said zone a nonsolvent liquid which is immiscible with either the polymer or the solvent contained in the starting polymer solution, contacting the solution of the solvent-soluble polymer in solvent therefor with the steam to volatilize the solvent and precipitate the polymer, withdrawing a mixture of steam and vapors of the solvent from the stripping zone, and withdrawing a mixture of the polymer and the non-solvent liquid from the stripping zone.

2. The process of claim 1 wherein the non-solvent liquid which is immiscible with either the polymer or the solvent is water.

3. The process of claim 1 wherein the solvent-soluble polymer containing solution in solvent is sprayed downwardly into a vertically positioned stripping zone while the steam is sprayed upwardly in said stripping zone.

4. In a process for the recovery of α-olefin polymers from their polymerization reaction mixture in organic solvents in which solvent-soluble polymer is separated from solvent by spraying a solution of the polymer in the solvent into contact with a countercurrently-directed spray of steam in a stripping zone defined by metal wall surfaces where the polymer as it precipitates adheres to said metal wall surfaces, tends to agglomerate and resists removal from the stripping zone, the improvement of maintaining a film of a liquid insoluble in both the polymer and solvent flowing over said interior metal wall surfaces defining said stripping zone.

5. In the process of claim 1, the improvement of removing the precipitated polymer from the stripping zone by way of a liquid seal leg of generally uniform cross-section in which the polymer for the first time forms a slurry with the film-forming liquid and condensed steam.

References Cited by the Examiner

UNITED STATES PATENTS

| | | | |
|---|---|---|---|
| 2,545,144 | 3/1951 | Green et al. | 260—85.3 |
| 2,964,513 | 12/1960 | Dale | 260—94.9 |
| 3,042,637 | 7/1962 | Crouch | 260—94.9 |

JOSEPH L. SCHOFER, *Primary Examiner.*

F. L. DENSON, *Assistant Examiner.*